No. 638,933. Patented Dec. 12, 1899.
B. McINNERNEY.
ELECTRIC GENERATOR FOR GAS ENGINE IGNITERS.
(Application filed June 10, 1899.)
(No Model.)
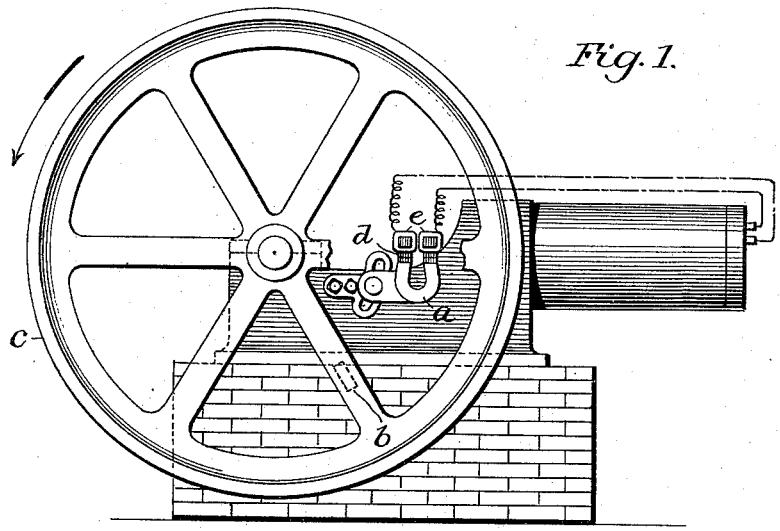
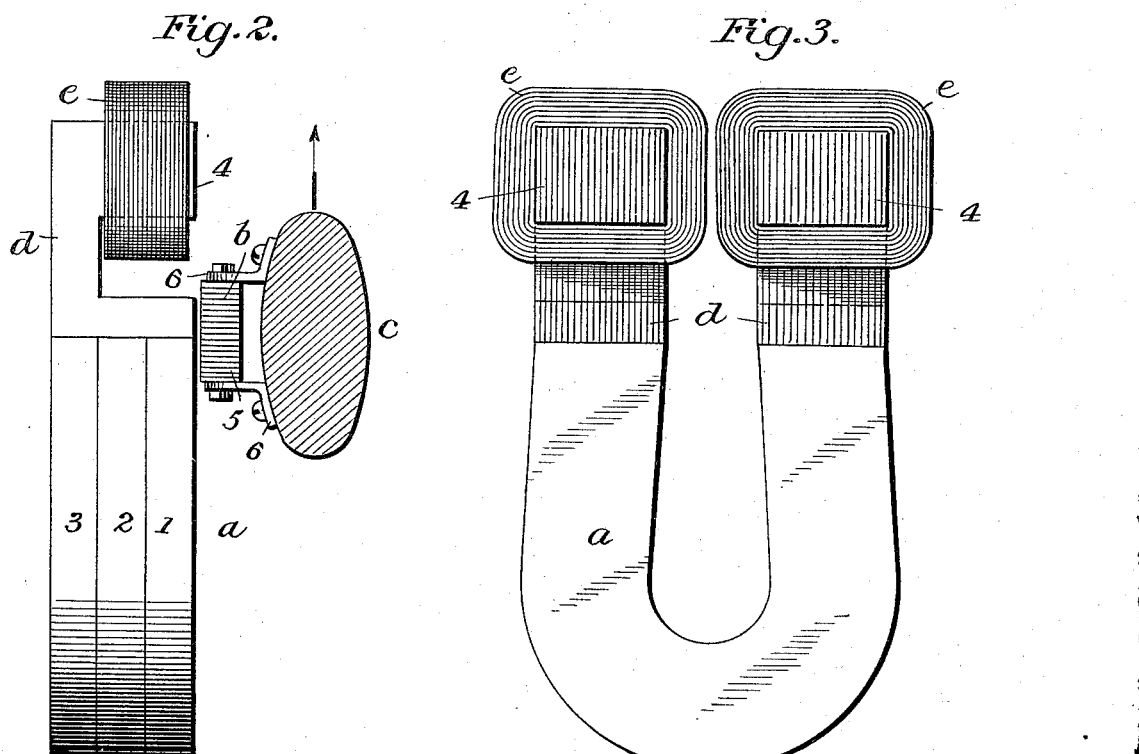
Witnesses
J. G. Hinkel
Arthur A. Fisher.
Inventor
Benjamin McInnerney
by Foster Freeman
Attorneys

UNITED STATES PATENT OFFICE.

BENJAMIN McINNERNEY, OF OMAHA, NEBRASKA, ASSIGNOR TO THE McINNERNEY MANUFACTURING COMPANY, OF SAME PLACE.

ELECTRIC GENERATOR FOR GAS-ENGINE IGNITERS.

SPECIFICATION forming part of Letters Patent No. 638,933, dated December 12, 1899.

Application filed June 10, 1899. Serial No. 720,103. (No model.)

*To all whom it may concern:*

Be it known that I, BENJAMIN McINNERNEY, a citizen of the United States, residing at Omaha, Douglas county, State of Nebraska, have invented certain new and useful Improvements in Electric Generators for Gas-Engine Igniters, of which the following is a specification.

In the operation of gas-engines where an electrical generator has been used for producing a spark, and especially in that class where the generator consists of a permanent magnet and a keeper one of which is movable with respect to the other, great difficulties have been encountered from the fact that in many sparking devices the parts are so operated that the spark is produced at improper periods, interfering with the regular operations of the engine and resulting in much loss of power. Further, in all generators of this type magnetic leakage has been so great that it has been essential to use generators of objectionable size. In order to avoid this result, I so construct the generator as to adapt it to be used to compensate for irregularities in the sparking device, while at the same time insuring a greater development of electric energy than heretofore, as hereinafter fully set forth, and illustrated in the accompanying drawings, in which—

Figure 1 is a side view of a gas-engine provided with my improved generator. Fig. 2 is an enlarged edge view of the generator, and Fig. 3 is a plan view of the permanent magnet.

The generator consists of two parts, the permanent magnet $a$ and the keeper $b$, and one of these parts is secured in a stationary position upon the engine and the other is movable. As shown, the permanent magnet $a$ is bolted to a part of the frame and the keeper $b$ is carried upon a part of the fly-wheel $c$.

The permanent magnet $a$ is preferably laminated or consists of a series of laminæ or plates 1 2 3, of any desired number, and in contact with each end of this permanent magnet is a pole-piece $d$, each pole-piece consisting of a series of laminæ which are bent or cut to a U shape, one limb in contact with the end of the permanent magnet and the other limb 4 projecting at right angles to the plane of the permanent magnet and having wound around it a coil of wire $e$, which connects with the coil upon the other pole-piece and is in circuit with the sparking device, which is not shown, as it may be of any suitable character.

The keeper $b$ may be of any suitable character, but preferably consists of a series of laminæ 5, connected together between two brackets 6 6, bolted to the fly-wheel at any suitable point.

Heretofore the keeper and the permanent magnet have been so arranged that the keeper first approaches the pole-pieces and then travels over the magnet, or the pole-pieces alone are presented to the keeper. I so arrange these parts that in the operation of the engine the keeper first travels from the toe or connected end of the permanent magnet toward the pole end. In consequence of this arrangement there is practically a short-circuiting of the permanent magnet through the keeper as the latter travels over the magnet, which tends to remove the flux from the pole-pieces. This lowers the flux in the pole-pieces to the lowest practical extent just prior to increasing it to a maximum, so that the rate of increase is very rapid, and as the generation of the current depends on the rapidity and magnitude of the change I am thus enabled to secure currents of much greater energy than heretofore. As the change takes place during the passage of the keeper across the gap between the pole-pieces and the ends of the permanent magnet, the time during which the change is developed can be varied by varying the extent of the gap, so as to adapt the generator to engines in which there are variations in the timing of the sparking device.

The time during which the generation takes place may be regulated by using pole-pieces having different intervals between the ends of the permanent magnet and the pole projections, and the latter may consist of L-shaped pieces instead of U-shaped sections; but the latter form is preferable, inasmuch as the pole-piece receives the magnetic flux from each of the laminæ of the horseshoe magnet directly without the flux passing from one of said laminæ to the other and then to the pole-piece, which is the case if the latter is L-shaped and only in contact with the lower section of the magnet.

While I have shown the permanent magnet as fixed and the keeper as movable, the keeper may be fixed and the magnet may be movable, and both the keeper and magnet may be constructed in different ways, and the movable portion instead of being secured to a fly-wheel may be connected with any other moving part of or connection with a gas-engine. In some cases the keeper may be a projecting part of the fly-wheel integral therewith.

I have found that by the construction and arrangement described I am enabled to secure a current of the desired volume by the use of a generator of much less size and weight than otherwise would be essential.

I have shown the coils $e$ as mounted on the ends of the pole pieces $d$; but it is evident that the coils would operate in substantially the same manner if otherwise placed, and I am not limited to the exact construction and arrangement shown.

Without limiting myself to the precise construction and arrangement of parts shown, I claim—

1. The combination in a generator for the sparking device of a gas-engine, of a permanent magnet with laminated wire-wound poles and a keeper, and means for carrying one past the other to first reduce the magnetic flux and then increase it suddenly to a maximum, substantially as described.

2. The combination in a generator for the sparking device of a gas-engine, of a permanent magnet, and a pole-piece for each end thereof provided with a wire-wound core arranged at right angles to the plane of the magnet at a distance from the end thereof but magnetically connected therewith, substantially as described.

3. An electric generator for the sparking device of a gas-engine, consisting of a permanent magnet, and a keeper, the magnet having a laminated terminal at each end consisting of an assemblage of bent pieces, one limb in contact with the end of the permanent magnet and the other wire-wound, substantially as set forth.

4. An electric generator for the sparking device of a gas-engine, consisting of a permanent magnet, a wire-wound laminated terminal in contact with each end of the magnet, a keeper, and means for connecting it to a fly-wheel, substantially as set forth.

5. An electric generator for the sparking device of a gas-engine consisting of a permanent magnet, a wire-wound laminated terminal in contact with each end of the magnet, a laminated keeper, and means for connecting it to a fly-wheel, substantially as set forth.

6. An electrical generator for the sparking device of a gas-engine, consisting of a horseshoe permanent magnet composed of laminæ, and U-shaped laminated terminals, one limb of each terminal in contact with all the laminæ of the permanent magnet at one end thereof and the other limb wire-wound, substantially as set forth.

7. A gas-engine provided with a sparking device and a fly-wheel, a stationary permanent magnet having wire-wound pole-pieces and a movable keeper, and means for causing the latter to traverse the magnet toward the pole-pieces, substantially as set forth.

8. In a gas-engine provided with a sparking device and a fly-wheel, a permanent magnet secured to the frame of the engine and having wire-wound poles, the wires extending to the sparking device, and a keeper secured to the fly-wheel, the parts arranged for the keeper to traverse the permanent magnet and act to short-circuit the same before reaching the wire-wound terminals, substantially as set forth.

9. In a gas-engine provided with a sparking device and a fly-wheel, a stationary permanent magnet secured to the frame of the engine and having wire-wound poles, the wires extending to the sparking device, and a movable keeper secured to the fly-wheel; the parts arranged so that the keeper acts to short-circuit the magnet before the keeper completes the circuit at the poles, substantially as set forth.

10. In a gas-engine having a sparking device and fly-wheel, a generator consisting of a permanent magnet upon the frame, and a keeper carried by the fly-wheel, the parts arranged to permit the keeper to travel over the magnet toward the terminals thereof, substantially as set forth.

In testimony whereof I have signed my name to this specification in the presence of two subscribing witnesses.

BENJAMIN McINNERNEY.

Witnesses:
W. CLARENCE DUVALL,
J. J. McCARTHY.